United States Patent
Kroll et al.

(10) Patent No.: US 7,457,636 B2
(45) Date of Patent: Nov. 25, 2008

(54) SELF DEFENSE CELLULAR TELEPHONE

(75) Inventors: Chase R. Kroll, Simi Valley, CA (US); Mark W. Kroll, Simi Valley, CA (US)

(73) Assignee: Kroll Family Trust, Simi Valley, CA (US)

( * ) Notice: Subject to any disclaimer, the term of this patent is extended or adjusted under 35 U.S.C. 154(b) by 381 days.

(21) Appl. No.: 10/219,901

(22) Filed: Aug. 14, 2002

(65) Prior Publication Data
US 2003/0003950 A1 Jan. 2, 2003

Related U.S. Application Data

(60) Division of application No. 09/584,326, filed on May 30, 2000, now Pat. No. 6,580,908, which is a continuation-in-part of application No. 08/895,358, filed on Jul. 16, 1997, now Pat. No. 6,115,597.

(51) Int. Cl.
*H04B 1/38* (2006.01)

(52) U.S. Cl. ................ 455/557; 455/550.1

(58) Field of Classification Search ........... 455/66.1, 455/90.1, 90.3, 404.1, 550.1, 556.1, 557, 455/575.1; 361/232; 362/183
See application file for complete search history.

(56) References Cited

U.S. PATENT DOCUMENTS

| | | | | |
|---|---|---|---|---|
| 4,486,807 A | * | 12/1984 | Yanez | 361/232 |
| 5,388,603 A | | 2/1995 | Bauer et al. | |
| 5,429,301 A | | 7/1995 | Franks | |
| 5,476,192 A | | 12/1995 | Julinot | |
| 5,781,114 A | * | 7/1998 | Chang | 340/574 |
| 5,786,546 A | | 7/1998 | Simson | |
| 5,901,206 A | * | 5/1999 | Soon | 455/556.1 |
| 5,986,872 A | * | 11/1999 | Chaput | 361/232 |
| 5,988,450 A | | 11/1999 | Cassarino | |
| 6,052,051 A | | 4/2000 | Whalen | |
| 6,254,249 B1 | * | 7/2001 | Kim et al. | 455/550.1 |

* cited by examiner

*Primary Examiner*—Sam Bhattacharya
(74) *Attorney, Agent, or Firm*—Vidas, Arrett & Steinkraus

(57) ABSTRACT

The present invention teaches an economical disposable emergency cellular telephone. A major object of this invention is a cellular telephone providing a self-defense capability to a user by generating high voltage shocks. A further object of the invention is a new technique for having a large number of cellular phones share the same small group of access numbers and serial numbers in order to reduce the monthly charges to zero for the end consumer. This makes it more practical to use cellular phones for data transmission and monitoring applications.

24 Claims, 20 Drawing Sheets

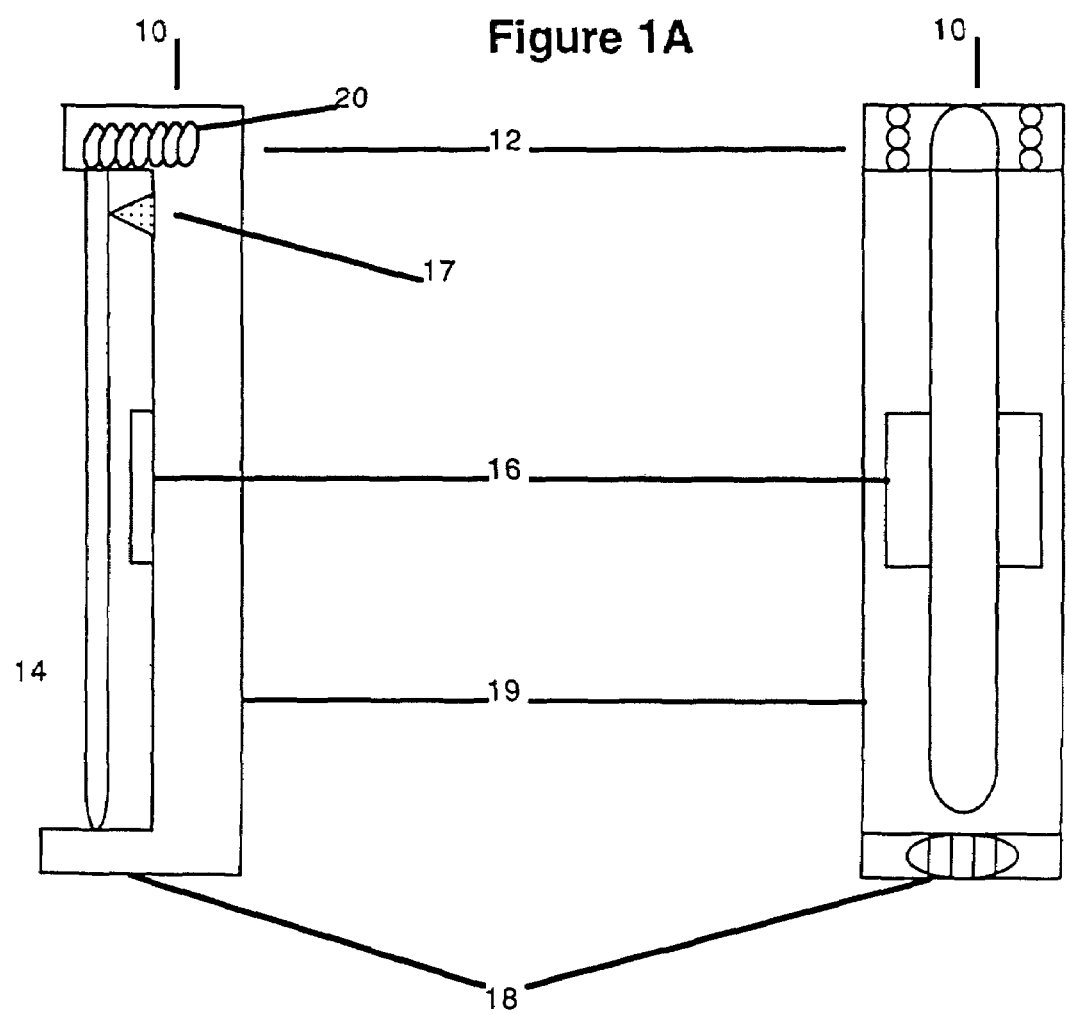

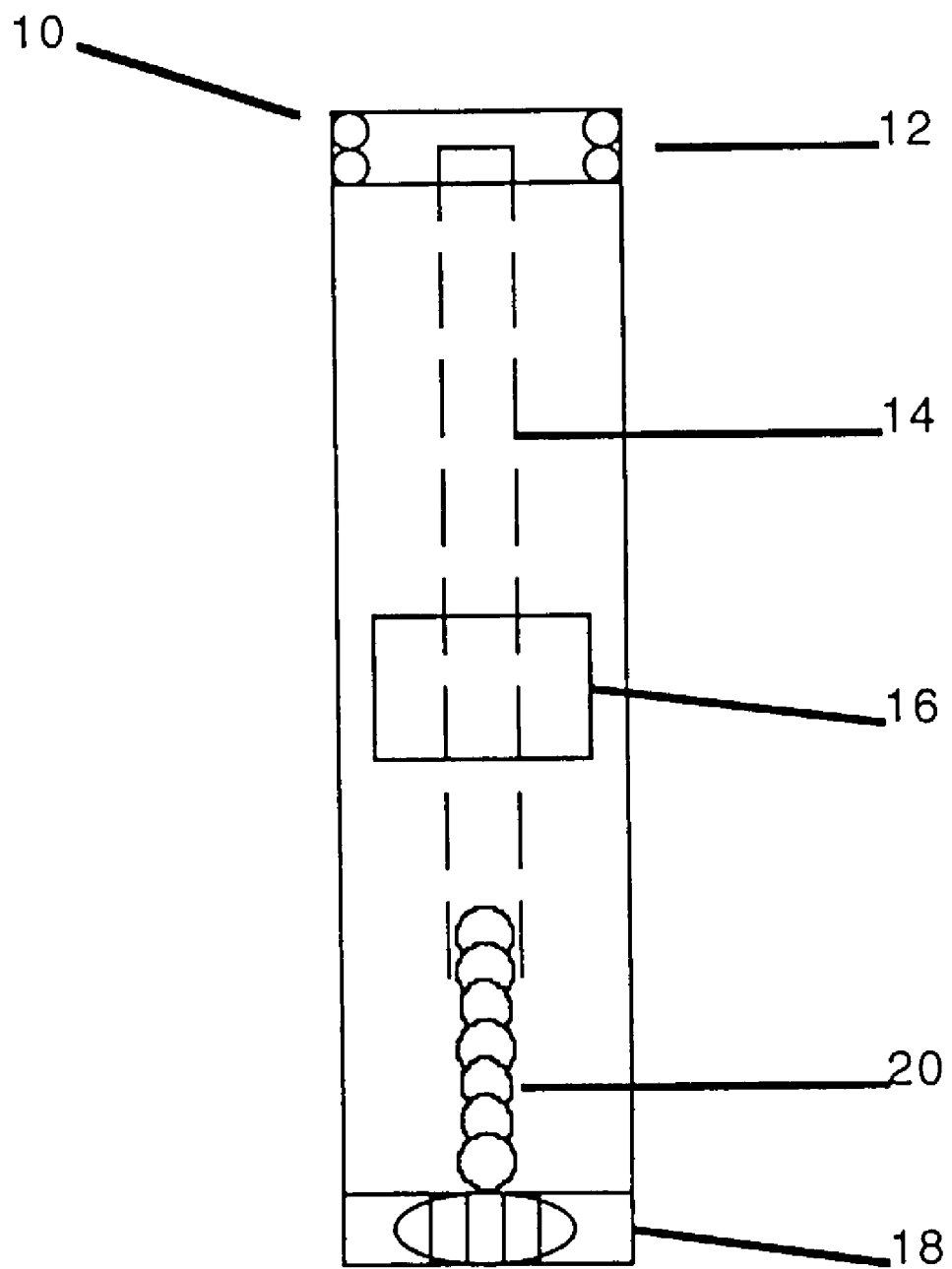

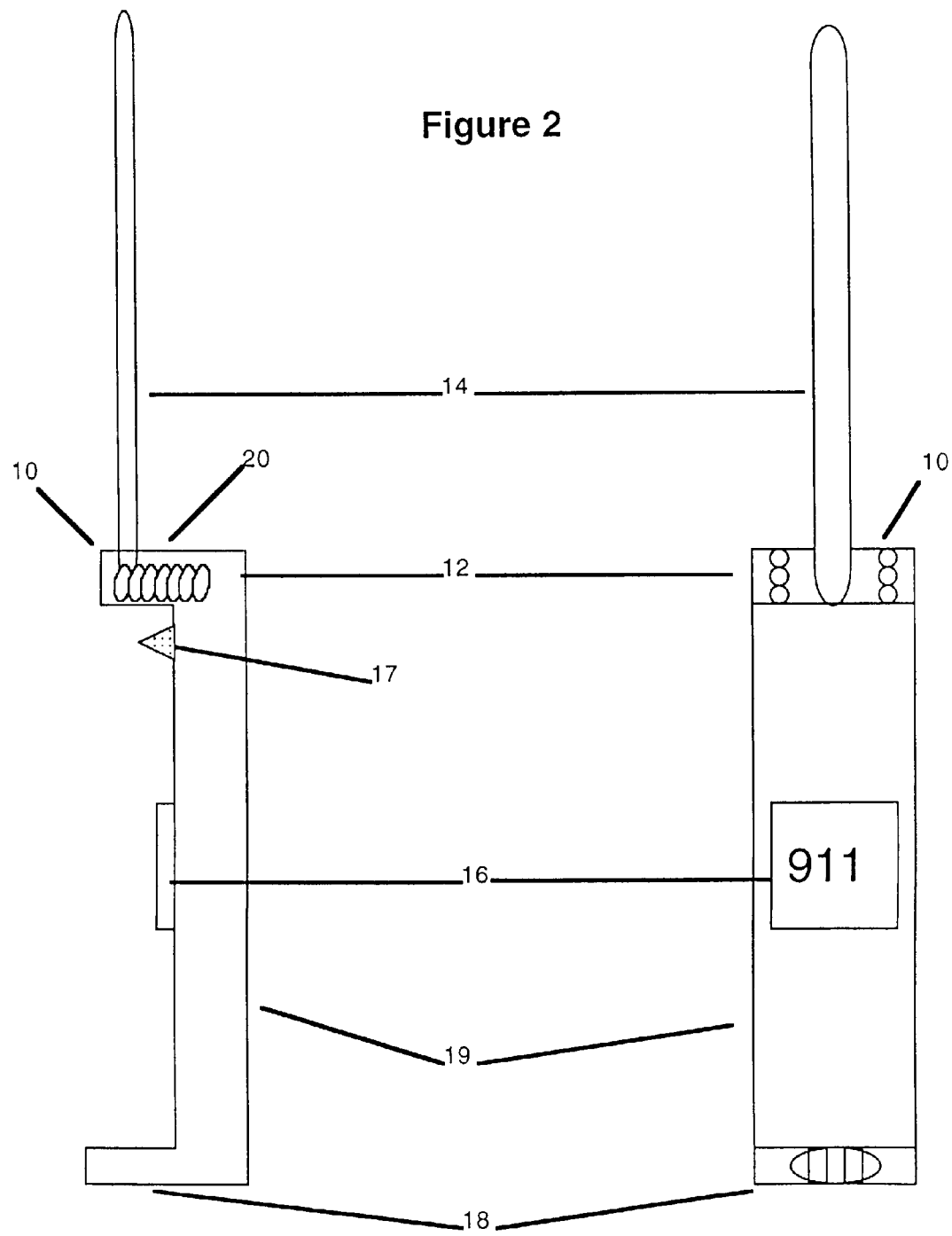

SELF DEFENSE CELLULAR TELEPHONE

This application is a divisional of "Generic Number Cellular Telephone" Ser. No. 09/584,326 filed on May 30, 2000 now U.S. Pat. No. 6,580,908 which was a continuation-in-part of U.S. Ser. No. 08/895,358 filed 16 Jul. 1997, "Disposable Emergency Cellular Phone" now issued as U.S. Pat. No. 6,115,597. This application is also related to U.S. Ser. No. 09/504,500 filed 15 Feb. 2000, "Thermal Battery Booster System," now issued as U.S. Pat. No. 6,198,249 and also related to U.S. Ser. No. 09/571,980 filed 15 May 2000, "Keyboard Signature Security System," now issued as U.S. Pat. No. 6,405,922 and both are incorporated herein by reference.

BACKGROUND OF THE INVENTION

As it is well known, cellular phones present a tremendous advantage in dealing with an emergency situation. For this reason a large percentage of automobiles are now equipped with these phones. However, there are several problems with present cellular phone systems. The primary one is that the owner must pay a monthly charge to maintain the use of a number. A secondary one is that the phones present a theft risk. The third problem is that the usage is so convenient that one can very easily run up large bills. Thus, while people tend to buy a cellular phone for emergency use they will often end up spending a significantly larger amount of money on the monthly charges than have been planned.

A number of expensive solutions for emergency cellular phones have been proposed. Grimes (U.S. Pat. Nos. 5,479,482 and 5,388,147) and Moore (U.S. Pat. No. 5,334,974) teach a cellular phone connected to a positioning system such as a GPS or Loran. The other art deals with cellular phones that are restricted to calling 911. These include Zicker (U.S. Pat. No. 5,465,388) and Seiderman (U.S. Pat. No. D 5,388, 148), although Seiderman also teaches an integrated credit card reader. Other art covers what might be called "children's restricted phones. The patent of Boubelik (U.S. Pat. No. 5,365,570) has a mechanical lock over the keyboard to restrict the use to an emergency call button. The art of Bogusz et al (U.S. Pat. No. 5,203,009) and the SOS Phone (product of SOS wireless communications of 3000 Airway Avenue, Costa Mesa, Calif. 92626) restrict the phone to only being able to call two different sites. These two could be, for example, 911 and home (or 911 and a towing company). The patent of Bishop et al (U.S. Pat. No. 5,563,931), assigned to SOS, teaches an emergency phone which requires modifications to the phone company equipment. These modifications would allow the call to bypass the normal cellular call process (col 10 lines 10-13) and to accept specialized numbers including a "pseudo area code" (col 19, lines 14-19). There is no economy in these inventions. For example, the SOS Phone requires the activation of an access service ($99 per year) and thus the phone saves no money per month. In fact, most cellular companies will give away a full function phone for free if one pays the monthly service.

Thus one would have a more economical and broader function phone by simply signing up for the cheapest monthly service and having the discipline to never use the phone except for an emergency. Unfortunately, few people have that level of discipline or control over third parties that might need the phone. Thus there is a need for an economical and durable disposable emergency cellular phone that can be operated without the need to pay a monthly access fee.

The most amusing and abusing pretense of a disposable emergency phone is that available from AAA Communications. AAA Communications takes advantage of the altruistic federal requirement that phones with disconnected accounts be able to still dial 911. AAA Communications buys phones with disconnected accounts and resells them for about $200. Their address is:
AAA Communications
291 Watershed
Noblesville Ind. 46060

As the cell phone is often used as an emergency communication device it would be useful to combine the cell phone with some sort of personal defense system such as a stun gun that made synergistic use of the battery and antenna of the phone. This has never been done. The patent of Cassarino U.S. Pat. No. 5,988,450 teaches a cell phone and various self-defense packages put together in one box with no synergistic communication. He includes pepper sprays and a taser. This teaches away from the instant invention. Similarly the patent of Julinot U.S. Pat. No. 5,476,192 teaches a pepper spray device disguised to look like a cell phone. This also teaches away from the instant invention.

BRIEF DESCRIPTION OF DRAWINGS

FIGS. 1a and 1b show a front and side view of the phone with the antenna collapsed.

FIG. 2 shows the side and front views of the phone with the antenna extended.

SUMMARY OF THE INVENTION AND DETAILED DESCRIPTION

Figure 3:
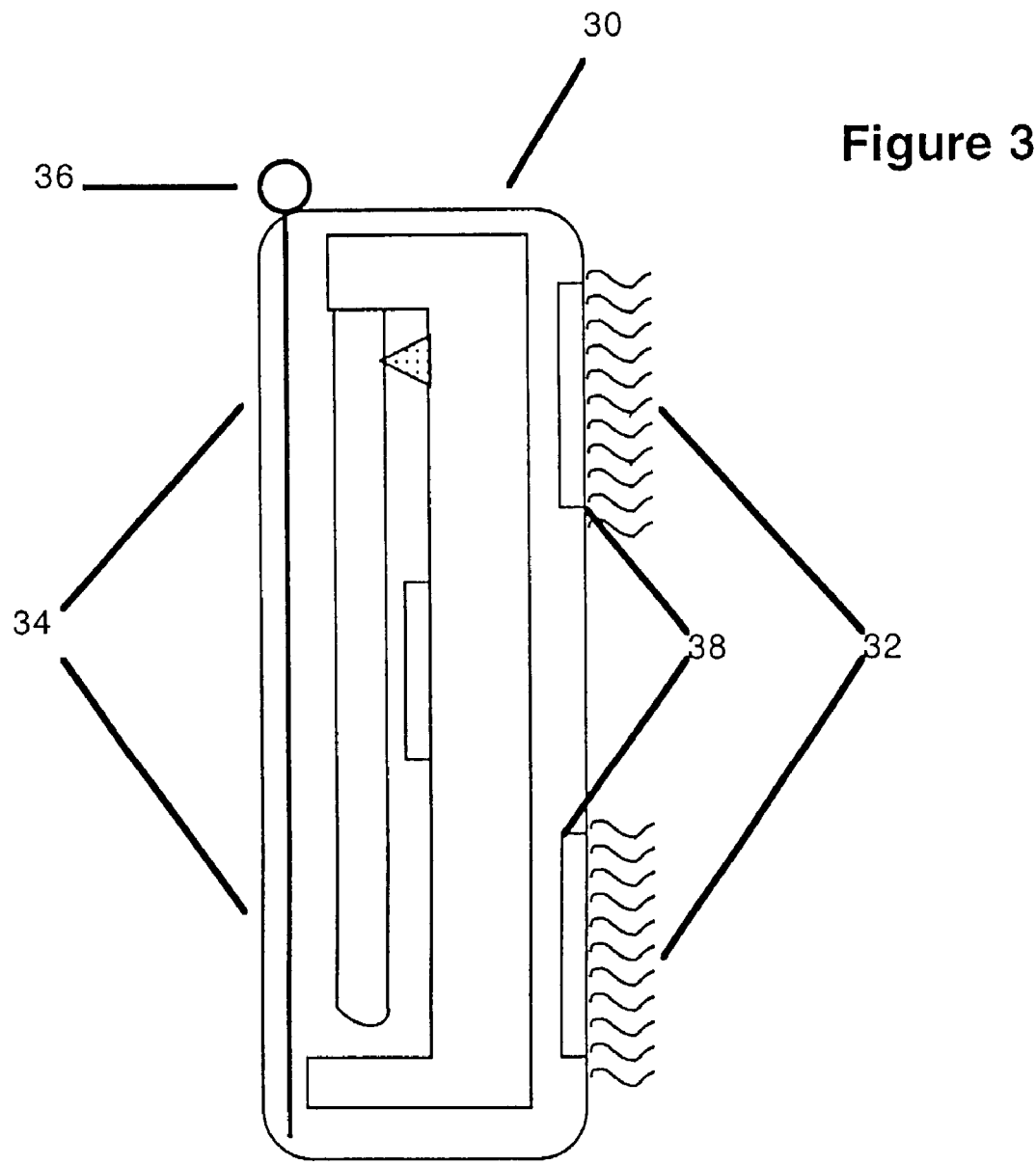
FIG. 3 shows the phone in its waterproof storage pouch.

FIG. 1 depicts the phone with the antenna collapsed from a side and front view. The basic mechanical components of the phone 10 are the speaker and speaker section 12, the antenna 14, and the microphone section 18. The center section 19 carries the batteries and the electronics. It also serves as the base for the "911" button 16.

A spring 20 to automatically deploy the antenna is shown in the speaker section. In an alternative embodiment, the antenna is slid down into the phone body with a linear spring. When the 911 button is pushed, it releases the antenna, which then slides out the end into a fully extended position when released.

In one embodiment, the whole phone is made waterproof through the use of waterproof switches, microphone, and speakers.

FIG. 2 shows the identical components but with the antenna extended. The operation of the spring is such that the antenna is normally fully extended.

FIG. 3 shows the phone of this embodiment in its weatherproof pouch 30. This pouch could be made of any water or weatherproof material including vinyl, polycarbonates or other polymers. Along the front end of the pouch 30 is an embedded quick release strip 34, which has a brightly colored large pull tab 36. For use of the phone the tab 36 is gripped and pulled down the complete length of release line 34 to open the pouch and access the phone. This then automatically deploys the antenna due to the operation of the integral spring.

On the back of the phone pouch 30 is an attachment means. In the preferred embodiment this is shown as a Velcro® type of mechanism 32. Alternatively it could be suction cups for glass or adhesives for metal. Further alternatives would include magnets for metal. The Velcro works particularly well for the roof cloth or floor carpeting of many cars. Yet another alternative attachment mechanism would be a combination of Velcro and magnet for universal attachment as shown using the magnets 38 embedded in the pouch.

The pouch is transparent to make the phone contents very obvious in an emergency situation.

Figure 4:
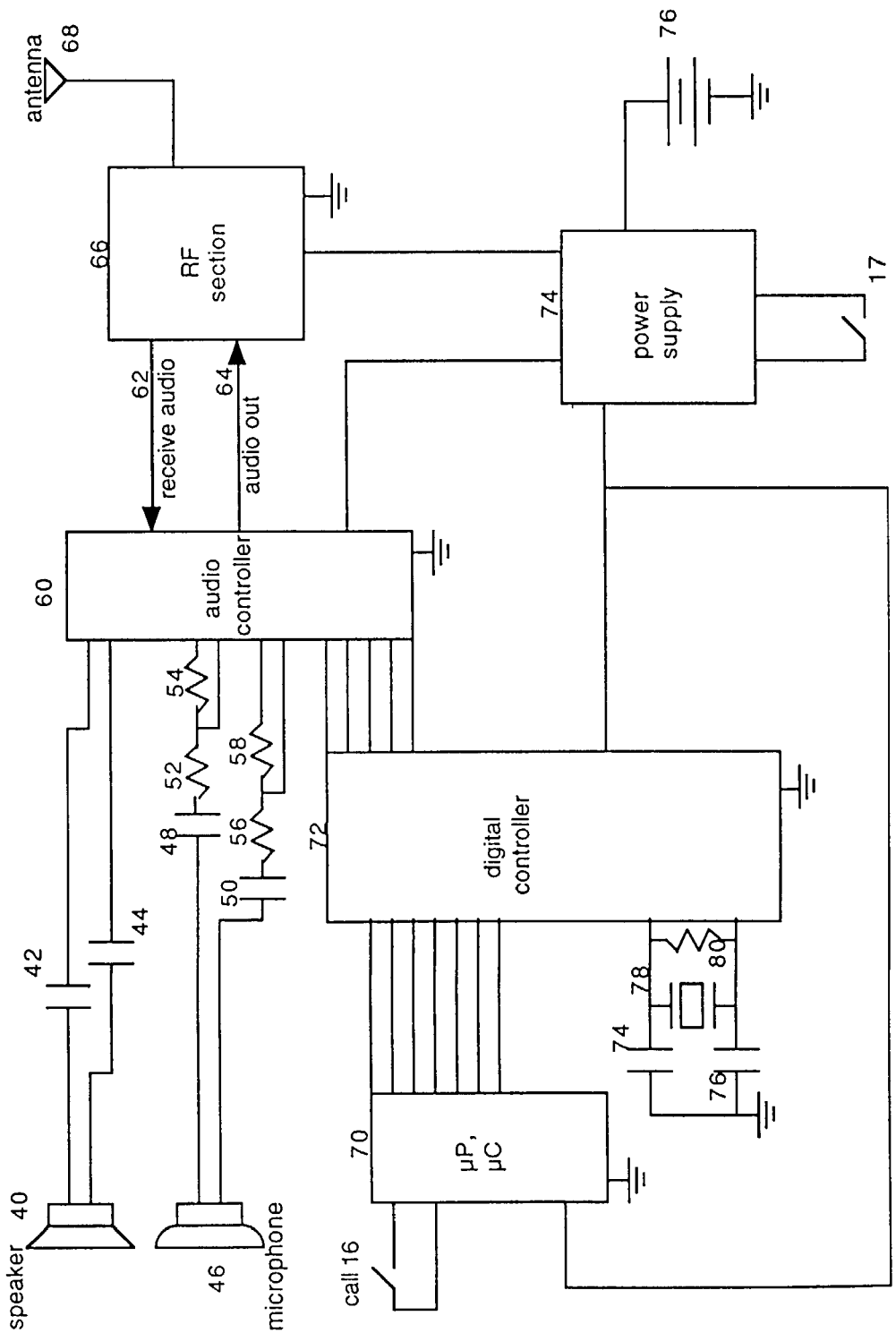
FIG. 4 shows the basic circuitry for the phone.

Due to the presence of dedicated integrated circuits the electronic portion of a conventional cellular phone design is doable by anyone skilled in the art of electrical engineering. The circuit in FIG. 4 is meant to be broadly illustrative. The circuitry is not meant to be in great detail as that is no longer necessary with this art. Speaker 40 is coupled through capacitors 42 and 44 to audio controller 60. The audio controller 60 receives a demodulated audio line 62 from the RF section chip 66. That RF section chip receives the RF signal from antenna 68. Microswitch 17 is shown connected to the power supply chip for automatically turning on the phone after the antenna is deployed as shown in FIGS. 1 and 2.

Microphone 46 is coupled through capacitors 48 and 50 and resistors 52, 54, 56, and 58 into the audio controller 60. The audio controller then sends the "audio out" signal on line 64 into the RF section 66 for final transmission out on antenna 68. When the call button 16 is depressed the microprocessor microcontroller 70 interprets this and activates the appropriate sequences and the digital controller 72 would then give the appropriate controls to the audio controller 60. Digital controller 72 is clocked by a crystal oscillator comprising capacitors 74 and 76, crystal 78, and resistor 80. All of the electronic components are powered by battery 76 through the power supply chip 74. A representative audio controller is the TCM 8010 of Texas Instruments, P.O. Box 655303, Dallas, Tex. 75265. A representative RF section IC is the TRF 1015 from Texas Instruments. There are numerous manufacturers of microprocessors or microcontrollers. Sample devices are the 8051 or 8032 available from numerous electronic manufacturers. A representative of the digital controller is the TCM 8002 from Texas Instruments. Representative power supply ICs are the TPS9013 or the TPS9104, both of Texas Instruments.

The battery 76 is a permanently installed primary cell such as an alkaline, lithium, or manganese dioxide cell although many other types could work. The cell must provide high peak currents in transmission but otherwise is not required to have extremely high longevity. By having a permanent primary cell there is an economy over the use of an expensive rechargeable cell and also over the use of a changeable primary cell due to the expense of the battery holders chambers and doors. These battery holders, chambers, and doors for a battery chamber also introduce reliability problems. As an alternative embodiment the battery could be a fixed or removable thermal battery or any practical battery.

Figure 5:
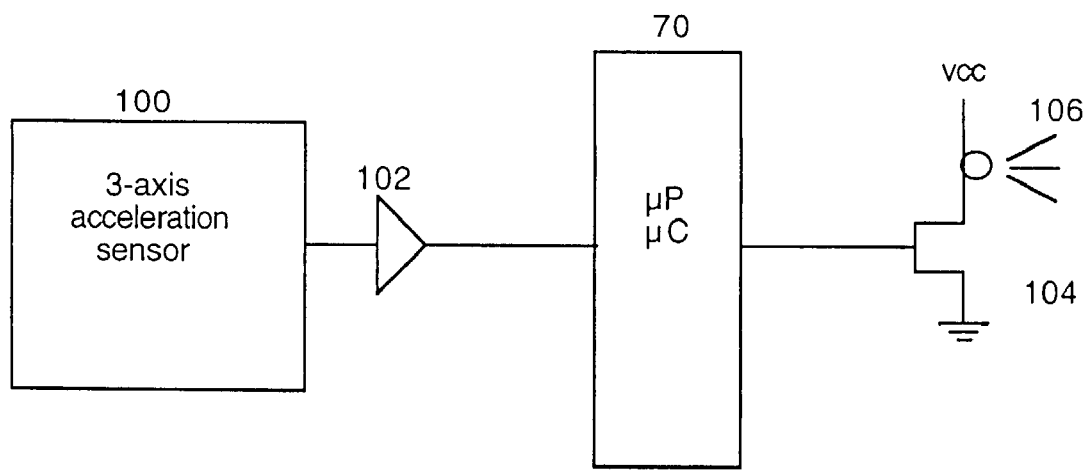
FIG. 5 shows the circuitry modifications for the automatic crash response feature.

Microswitch 17 is activated by the antenna springing out and thus automatically turning on the device. FIG. 5 depicts the circuit modifications to allow for the automatic crash activation feature. The three-axis acceleration sensor 100 will detect the sudden acceleration from a crash and pass this on to three-channel amplifier 102 and then on to the microprocessor and microcontroller 70. If a sufficient force is detected then the device will turn on automatically and begin pulsing through transistor 104 to pulse integral light 106. The light 106 is also used to light up the 911 button after the antenna is deployed. The microprocessor microcontroller will also signal the rapid beeping through the phone speaker 40, which is shown in FIG. 4.

If the phone is not operated within 5 minutes of the "crash" then it automatically turns off to save battery life. Alternatively the phone could include a "hang-up" button which could also stop the flashing and pulsing.

Suitable acceleration sensors are available from Analog Devices of Norwich, Mass.

Figure 6:
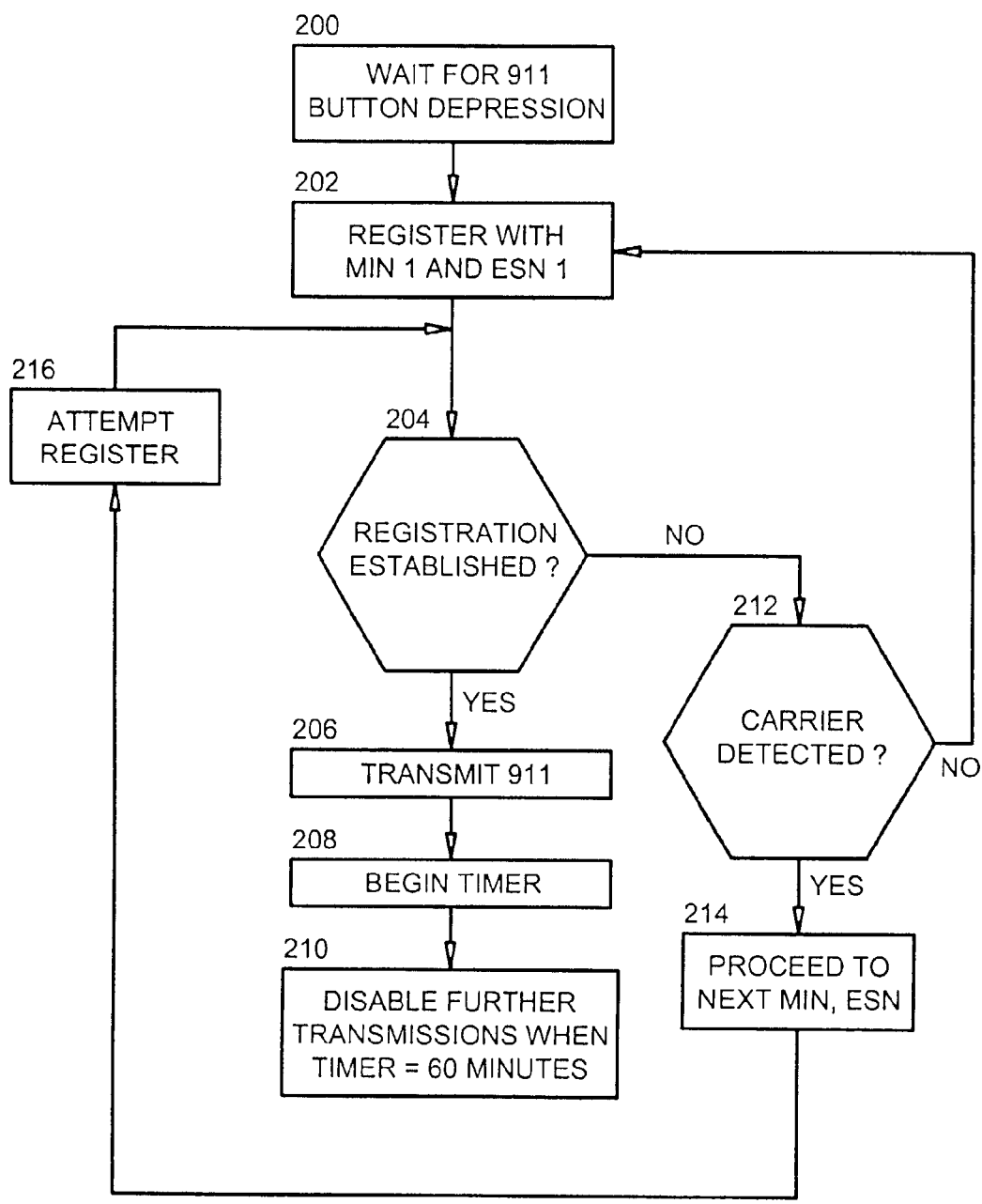
FIG. 6 shows the registration process to allow the user to bypass a monthly access fee.

FIG. 6 shows the flow chart for the operation of the phone with particular attention to the unique feature that allows the operation of the phone without the customer having to pay a monthly access fee for a private number.

The provider (distributor) of the disposable emergency cellular phones will pay a monthly fee for a few phone numbers. Each of these phone numbers (mobile identification number [MIN]) comes with an electronic serial number (ESN) which will be transmitted with the MIN in order to register to the cellular system. (A conventional cellular phone also transmits its MIN and a unique ESN, which it registers. The ESN is unpublished and is matched with the phone to minimize fraudulent usage.) One feature of this invention is that thousands of the disposable emergency phones could share a small set of MINs and matching ESNs.

Assume that the average call requires 5 minutes. The table below gives the number of MINs required for a smoothed (average) load as a function of the number of subscribers. The last column gives the estimated number of MINs required to reduce waits as call volume will not be perfectly constant.

| number of subscribers | MINs needed for average load | MINs needed to minimize waits |
| --- | --- | --- |
| 100 | 1 | 3 |
| 200 | 1 | 5 |
| 500 | 2 | 8 |
| 1,000 | 4 | 12 |
| 2,000 | 7 | 17 |
| 5,000 | 18 | 30 |
| 10,000 | 35 | 49 |
| 20,000 | 70 | 85 |
| 50,000 | 174 | 190 |
| 100,000 | 348 | 364 |
| 200,000 | 695 | 712 |
| 500,000 | 1,737 | 1,753 |
| 1,000,000 | 3,473 | 3,490 |
| 2,000,000 | 6,945 | 6,962 |

-continued

| number of subscribers | MINs needed for average load | MINs needed to minimize waits |
|---|---|---|
| 5,000,000 | 17,362 | 17,378 |
| 10,000,000 | 34,723 | 34,740 |

In operation, the first step is to wait for the 911 button depression 200. Step 202 is to register with a MIN and ESN. Step 204 is to verify that registration (log on) is established. If it is established then the method proceeds on to step 206 which is to transmit the 911 number. Then step 208 begins a timer. Finally, at step 210 the device will disable further transmissions when the timer reaches 60 minutes. In an alternative embodiment, a counter is used to limit the number of 911 calls to a small fixed number, say 5. The total talking time would then be limited only by the battery life and the patience of the 911 operators. If at step 204 registration was not established then the method proceeds to step 212, which is to verify that a carrier signal is present. If no carrier is detected then the method returns to step 202 to attempt registration again. If the carrier is detected then the method proceeds to step 214 and increments to the next MIN (phone number) and ESN (serial number). It then attempts another registration in step 216. The reason for the attempt for different numbers is that it is conceivable that two customers would both be trying to make a 911 call at the exact same time. Were that to occur, the first caller would normally lock out that number nationwide and prevent the second caller from getting through. Thus a disposable cellular phone provider would have a few numbers that a minimal monthly service fee is paid for. The system could try the MINs and ESNs (phone and serial numbers) in a fixed sequence or a random fashion. Alternatively the phone could simply log on with a public phone number and transmit a 311 or 911 call since the FCC requires phone companies to accept 311 and 911 calls regardless of the account status.

Figure 7:
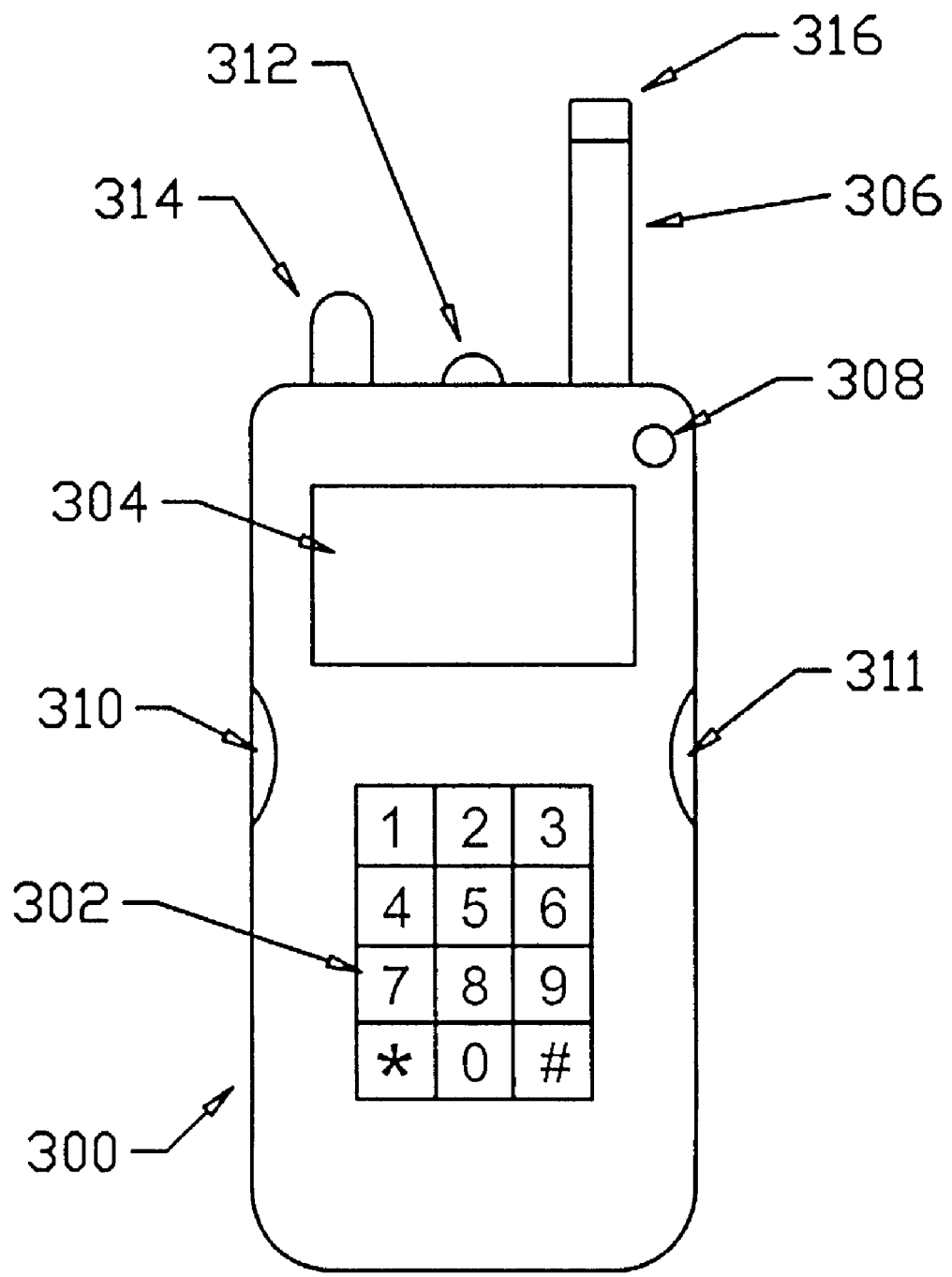
FIG. 7 shows the physical embodiment of the stun gun version of the cell phone.

FIG. 7 shows the physical embodiment of the stun gun in this version of the cell phone. The basic phone 300 has a conventional key pad 302 and read-out display 304 along with the antenna 306. There is also the on-off button 308 as standard.

There is a left side high (mechanical) resistance push button 310 to enable the flashlight. Also there is a right side push button 311 to enable the electrical stunning operation when used in conjunction with the switch 310. When the flashlight is enabled then the battery from the cell phone is connected to high intensity light bulb 312. When both switches 310 and 311 are enabled simultaneously a high voltage is developed between the pseudo antenna tip 314 and the tip of the normal antenna 316. The angle between the tips 314 and 316 is very important as it allows the shock to be delivered from the operator's right hand and angled to attack the arm or hand of an attacker without having to have a full perpendicular contact.

Figure 8:
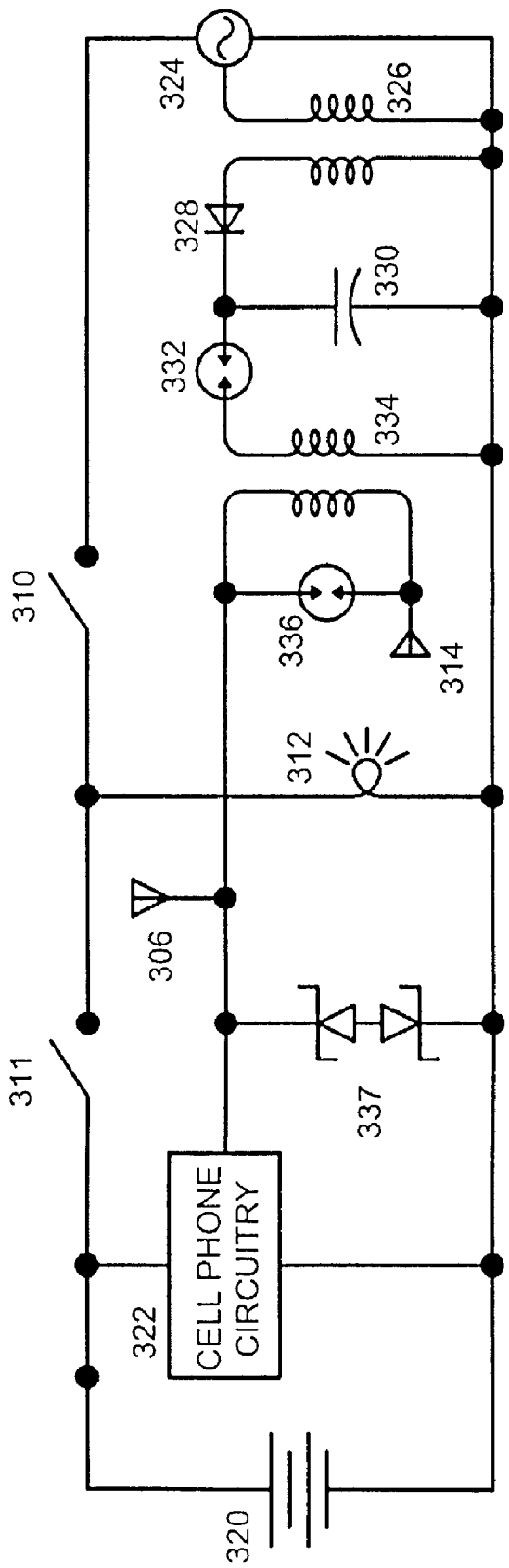
FIG. 8 shows the electrical circuitry of the stun gun cell phone.

FIG. 8 shows the synergistic operation of the circuitry. We begin with the battery 320, which is connected to the conventional cell phone circuitry 322, which then drives the conventional antenna 306 for transmission. When switch 311 is depressed then the battery power 320 is delivered directly to the light bulb 312 to cast an intense beam.

When both switches 311 and 310 are depressed then battery current is delivered to oscillator 324. Oscillator 324 provides an AC current to transformer 326 which develops a high voltage output which is rectified by diode 328 and stored in capacitor 330. In this way a voltage is built up to over 1000 volts on capacitor 330. When the voltage exceeds 1000 volts on capacitor 330 then the hermetically sealed spark gap 332 will break down and deliver a short intense current through transformer 334. The output of transformer 334 (of about 25,000 to 50,000 volts) will then appear between contacts 306 (which is the conventional antenna) and 314 which is the shocking probe "pseudo antenna." The hermetically sealed spark gap 336 limits that voltage to prevent damage to the circuitry. The Zener diodes 337 serve to protect the cell phone circuitry from the effects of this high voltage and keep the antenna 306 closer to a ground potential.

Another key element of this invention is the use of a thermal battery for an emergency phone system. U.S. Pat. No. 6,041,255 teaches the possible use of a thermal battery for a single use external defibrillator.

Figure 9:
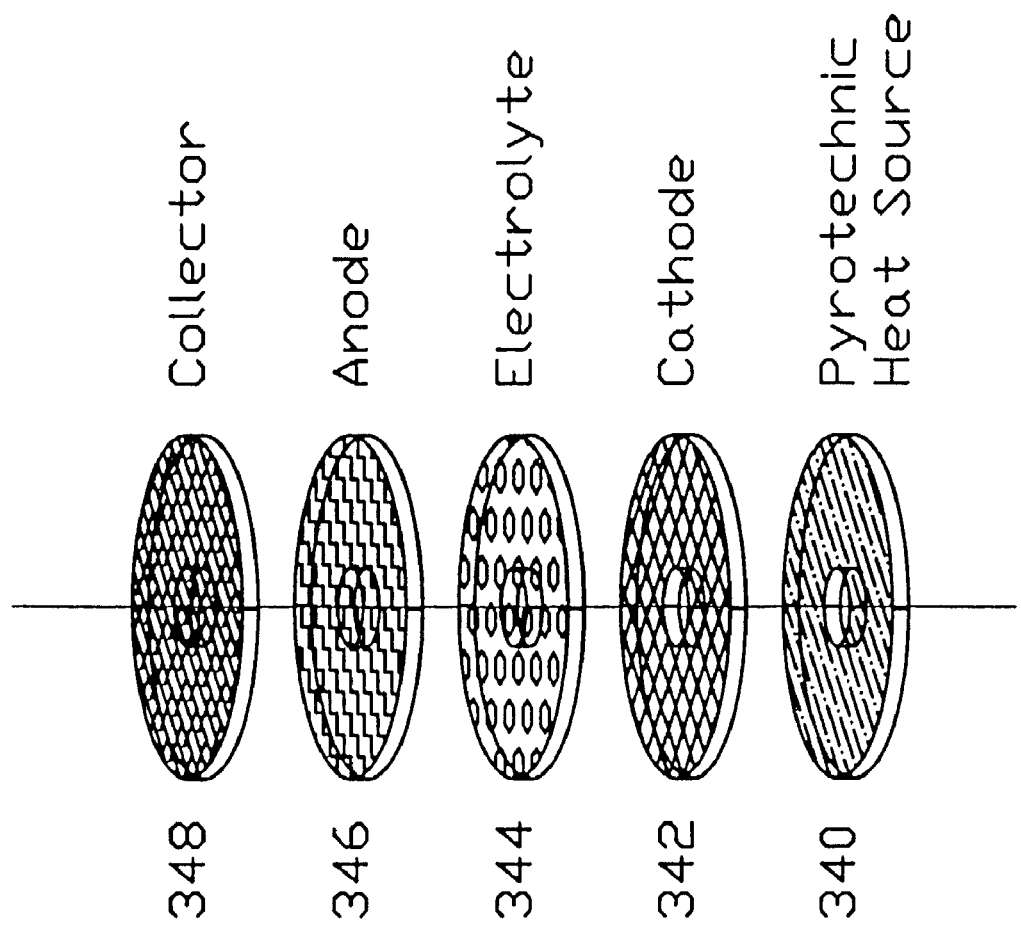
FIG. 9 shows one cell of a thermal battery.

The detailed construction of the piles of a thermal battery is shown in FIG. 9. It begins with a pyrotechnic heat source 340 which is followed by cathode 342 which is followed by an electrolyte 344, followed by anode 346 followed by current collector 348. The electrolyte at normal ambient temperature is a solid, insulating inorganic salt. The electrolyte is rendered molten by the pyrotechnic heat source. The heat melts the electrolyte which causes it to be conductive and deliver electrical power at an extremely high rate. The thermal battery has many attributes making it ideal for an emergency phone system. First, it has no leakage current until it is triggered. Thus it has a shelf life of ten or twenty years. It then delivers current at an extremely high rate for a short period of time on the order of minutes. This is ideal for long range, high power transmission.

Representative materials for the battery anode include lithium, calcium, magnesium, and others. The electrolytes that have been used successfully in these batteries have been lithium chloride and potassium chloride mixtures primarily. Representative cathodes are $FeS_2$, $K_2Cr_2O_7$, $WO_3$, $CaCrO_4$, and $V_2O_5$ for example. A typical pyrotechnic heat source is iron with $KClO_4$.

Figure 10:
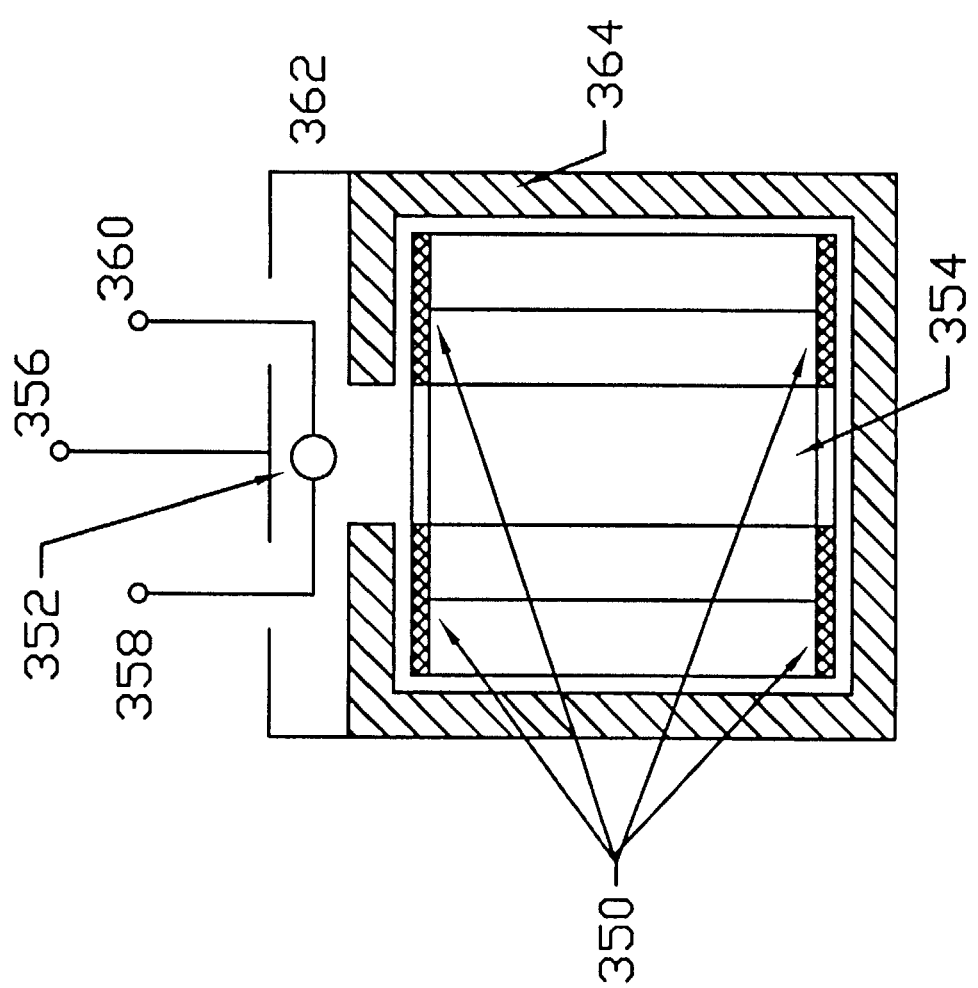
FIG. 10 shows the internal construction of a thermal battery with the cells and housing.

FIG. 10 shows the overall construction of a thermal battery. Battery piles 350 are shown stacked as discs leaving an open core 354. The electric match 352 is placed above that open core. Electric match 352 is ignited by current passing through contacts 358 and 360. Connection 356 is used for delivery of current from the battery and the other current delivery connection can be one of the match terminals, either 358 or 360. As an alternative, yet a fourth electrode could be used for the battery output current. Insulation material 364 is wrapped around the battery to keep it very hot so that it can achieve its high levels of efficiencies. Temperatures on the order of 230° Celsius are not uncommon. Representative insulation that can be used include Mica, silicon-bonded Mica, FiberFrax, Microtherm, Aluminum/Mica combinations, and Min-K.

In the embodiment using an electric match to trigger the thermal battery, a conventional non-thermal small battery such as a lithium battery will deliver current when connected through the electric match circuitry. This will cause the thermal battery to go to its high temperature mode and then deliver current at an extremely high level.

Figure 15:
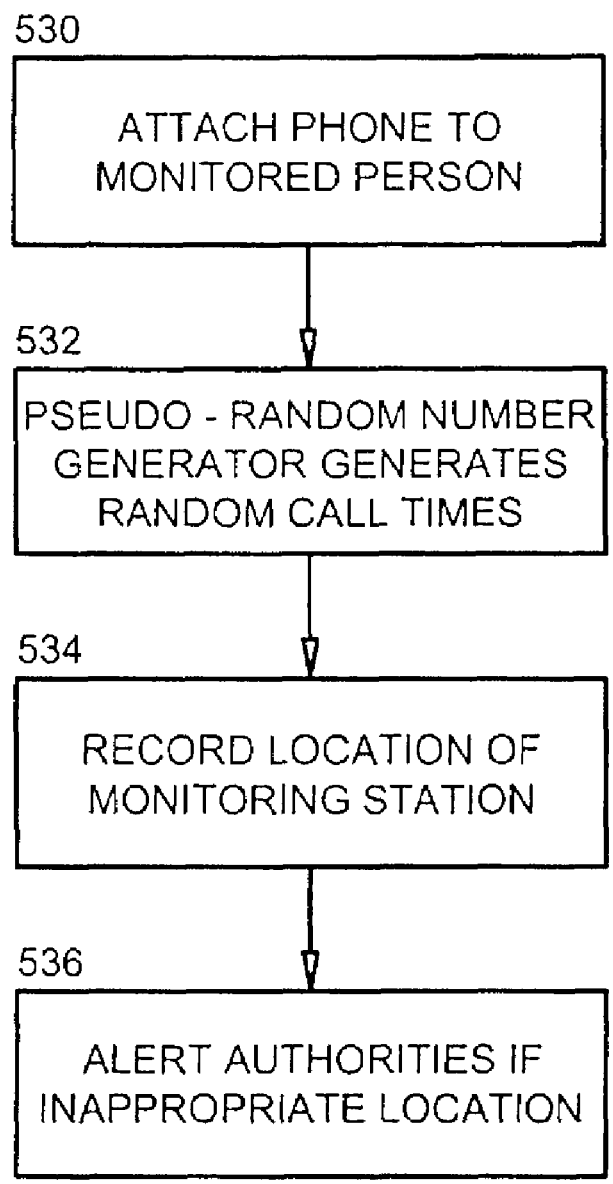
FIG. 15 shows the method of using the instant invention for monitoring persons.

Another preferred embodiment for this invention is shown as FIG. 15 of "Thermal Battery Booster System" Ser. No. 09/504,500, filed Feb. 15, 2000. In this case the electric match is replaced by a percussion ignitor. This is essentially a primer from a shotgun shell. This has an impact activated explosive. A spring loaded percussion ignition system comprising a firing pin and spring (or other mechanical activation means). Then the firing pin will contact the percussion ignitor to begin the thermal battery ignition process. This will then allow the thermal battery to begin delivering extremely high currents without the need for an electric match and small triggering battery.

Figure 11:
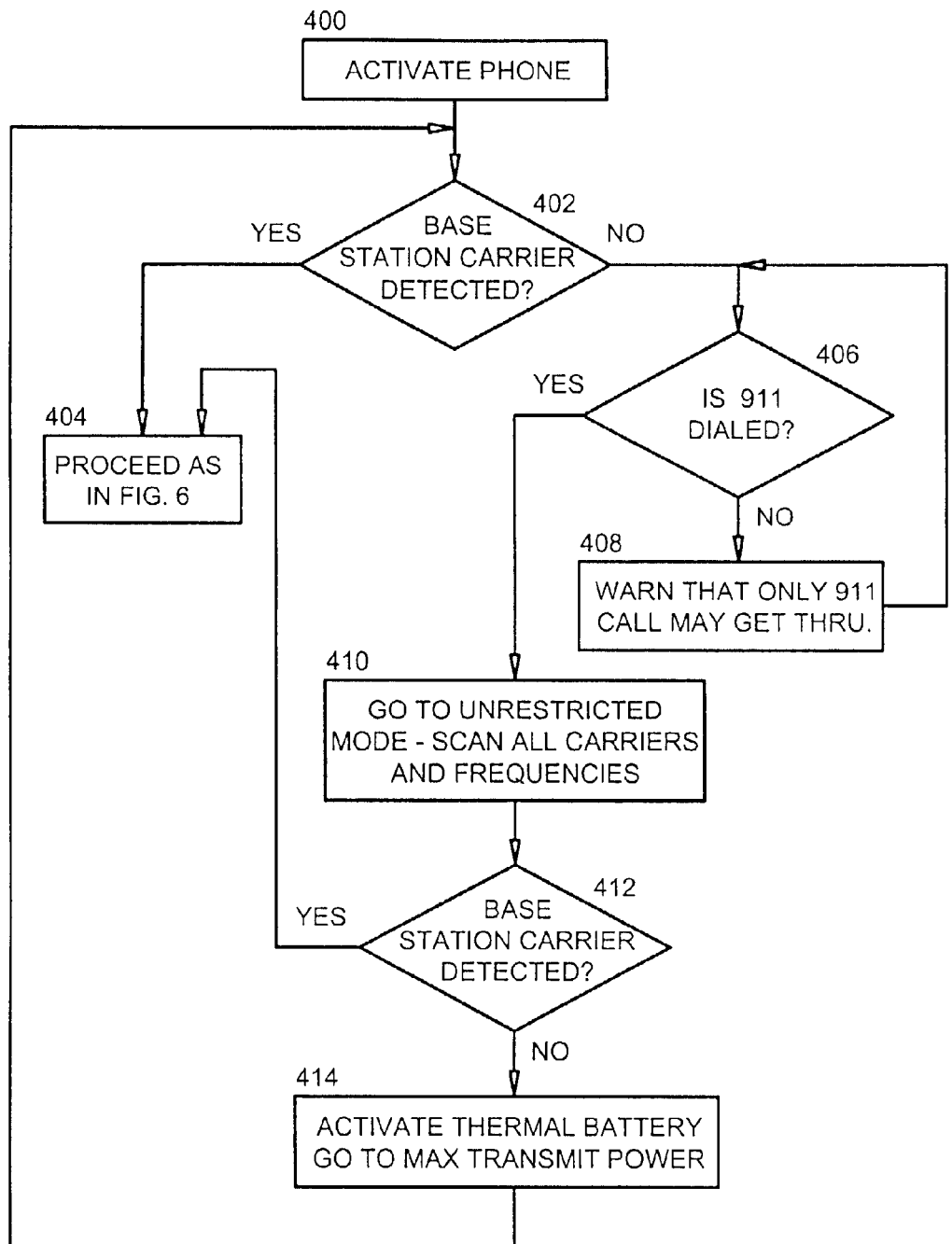
FIG. 11 shows the method of the operation of the thermal battery emergency cell phone.

FIG. 11 shows the method of operating the thermal battery emergency phone. We begin at step 400, which is to activate the phone. At step 402 the base station carrier is attempted to be detected. If the base station carrier is detected then we go to step 404 which is to proceed as in FIG. 6 to register. If the base station carrier is not detected in step 402 then we go to step 406 and the system asks if the number 911 was dialed. If it was not then we go to step 408 which warns that only 911 calls can get through with the high-power operation at this point and returns to step 406. If 911 was, in fact, dialed then the system permits the move to step 410 which is to go to unrestricted mode in which case it will scan all carriers and frequencies. Thus if the subscriber's main provider was the local System A which is unavailable it could also allow System B as well as other frequencies. At step 412 the system looks for a base station carrier to be detected. If it is, then it would proceed as in FIG. 6 before. If it is not then the system proceeds to step 414 at which point the thermal battery is activated and the system goes to a maximum power transmit level of 20 watts. This is important as a thermal battery is able to provide at least 20 watts of output power, or even up to 50 watts but only for a short period of time. Thus the output power is merely limited by the output stage transistors and a significant increase in range would be obtained. The conventional cell phones are limited to three-watt power and thus, for this emergency operation, an output of 12 watts gives an increase of four times which would give a doubling of the range by the square power law.

The invention of using multiple MINs and ESNs for a generic number phone system has many uses beyond the emergency cellular voice phone. Some of these embodiments are described below.

The set of MINs and ESNs for a given set of phones would be stored in the memory of each of the phones. The provider can download additional numbers to generic phone number customers if it is found that they are experiencing excessive waits.

Figure 12:
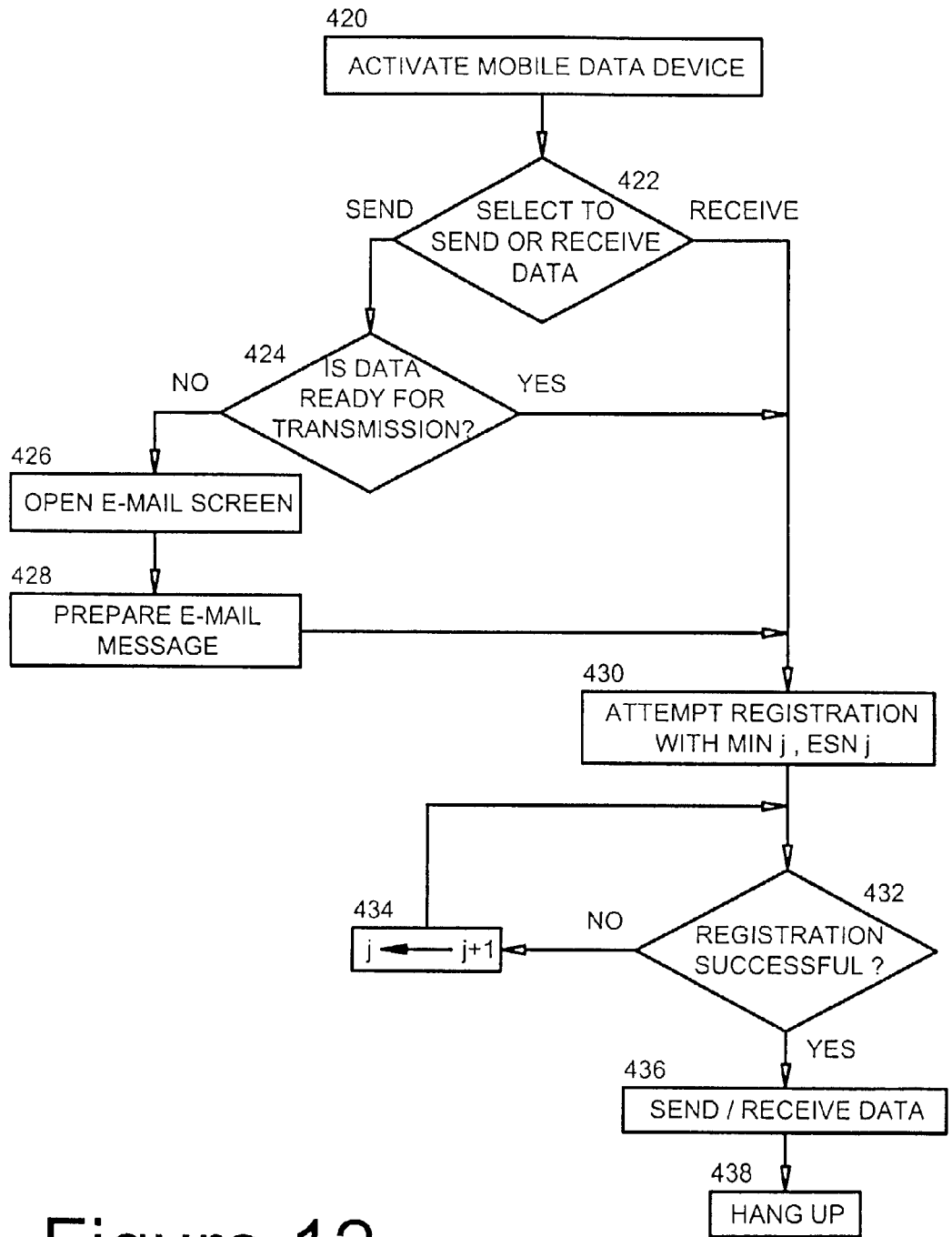
FIG. 12 shows the method of operation of the generic number email/data phone.

FIG. 12 shows the operation of the generic number phone for sending and receiving local data. The subscriber unit could be a laptop computer, a palmtop computer, a personal digital assistant, a cellular phone with a sufficient display to read Email, or other means of entering or displaying digital messages. It could be a car computer with a digital display terminal. The exact hardware system is quite flexible. The operation begins in step 420 where the operator activates the mobile data phone. At step 422 the selection is made to send or receive data. If the decision is made to send data then the system proceeds to step 424 and asks if the data is ready for transmission. If it is then the system proceeds to step 430 which it would also go to if it was ready to receive data. If at step 424 the system is not ready to transmit data then it goes to step 426 where it opens an email screen for the operator. At this point the operator must at step 428 prepare the email message. When this is ready then everything goes to step 430 where the system will attempt a registration with a randomly chosen mobile identification number $MIN_j$ and an electronic serial number $ESN_j$. These numbers are not capriciously chosen but are rather from the list of approved numbers for this service. At step 432, if the system finds the registration was unsuccessful due to the fact that someone else was using that mobile identification number and that serial number, then the system goes to step 434. At that point j is increased by 1 and the system goes back to step 430 to attempt registration with the next $MIN_j$ and $ESN_j$. When registration is finally successful then the system proceeds to step 436 where it will send and receive data. After the data is sent or received the system proceeds to step 438 which is to hang up.

Figure 13:
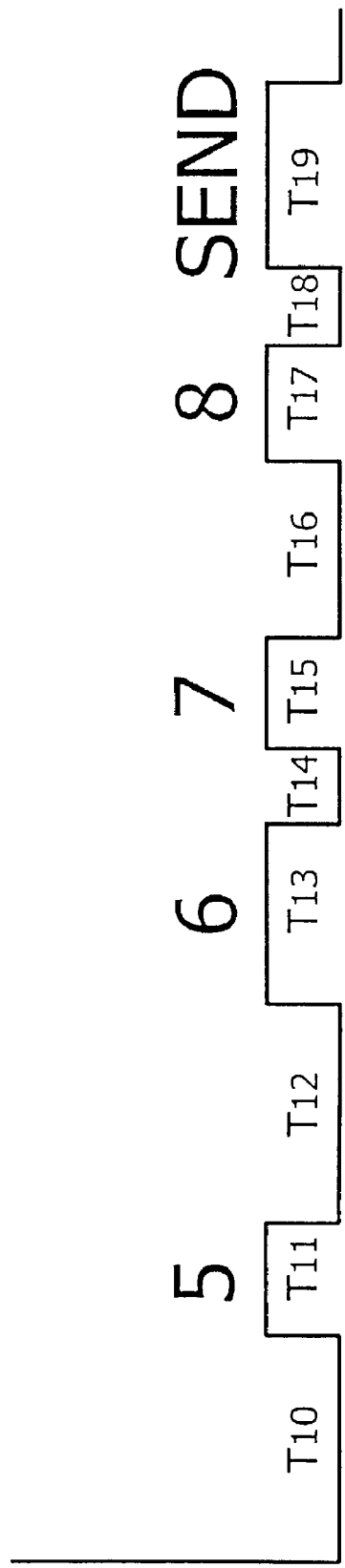
FIG. 13 shows the "on-off" times for dialing a four digit number or PIN.

FIG. 13 shows the on/off times that are available when an operator types a four digit number. In this case the operator has typed in a PIN or a subscriber's line number of 5678. This operation generates eight distinct times beginning with the "space" time T10, which is the time from the prompt or previous number to the pushing of the "5" key.

Then there is the "key-down" time T11 which is the amount of time the "5" key is held down, etc.

This set of times provides a distinct signature of the operator due to the fact that everyone has different typing habits. This is the subject of co-pending application Ser. No. 08/942,820, "ATM signature security system" filed Oct. 2, 1997. The operation of this security system is shown in FIG. 14 and also later on in FIG. 17 as one application.

Figure 14:
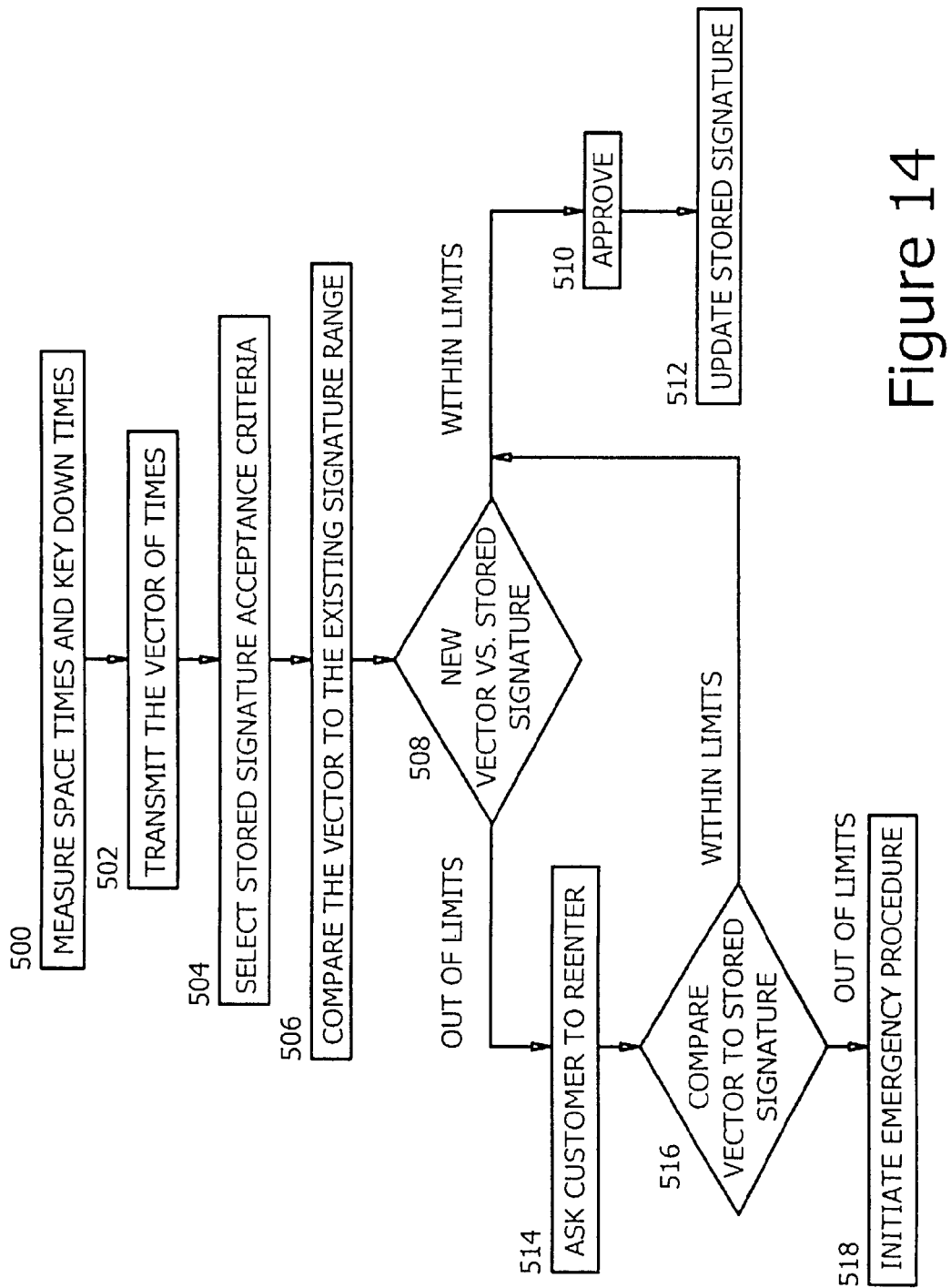
FIG. 14 shows the method of using on-off times for identification security.

In FIG. 14 we begin with step 500 which measures space times and key down times during entry of a phone or PIN. Step 502 of the system transmits the vector of times 504 to the base station which selects the stored signature acceptance criteria based on the type of phone being used. In step 506 the transmitted vector is compared to the existing signature range. In step 508 the comparison results are acted on. If the transmitted vector of times is found to be within limits then the call or transaction is approved at step 510. Then at step 512 the vector is used to update the stored signature slightly to account for aging or changing of patterns of the user.

If, at step 508, the vector was out of limits then the customer is asked to reenter the number at step 514. The vector is then compared to the stored signature at step 516 and if it is then found within limits then the operation proceeds to step 510. If the vector is found to be outside of limits for the second time then the system goes to step 518 to initiate the emergency procedure.

An important alternative embodiment to the system as shown in FIG. 14 involves comparing the signature internally at the phone at step 508 rather than at the base station. This would allow the phone to be modified and not require modification of base stations. The disadvantage is that one could perhaps fraudulently modify phones.

FIG. 15 shows the application of this generic number cellular telephone to monitor people. This could be a criminal in house arrest or a child. The step 530 is to attach a phone to monitor a person with a tamperproof means. Step 532 is pseudo random number generator, which generates random call times. This is to prevent a sophisticated criminal from having a scanner, or other sense of detection of a cellular phone transmission, detecting when the cell phone is making a transmission and assuming that he or she is free to move about in between. The pseudo random number generator would randomly generate call times between one minute and several hours of each other.

In step 534 the location of the call is recorded at a monitoring base station as the call comes in. This location could be generated by modern cellular location systems from "enhanced 911" service or could use even the simpler version, which simply gives the cellular antenna involved. The more sophisticated but expensive system would involve the use of GPS receiver including the monitor. This has a disadvantage of being unable to report when someone is indoors so the GPS system would have to store the most recent good GPS data. To prevent the fraud of having the criminal cover the GPS antenna to allow movement the system would have the backup of noting the base cellular antenna to demonstrate significant movements.

Finally at step 536 authorities are alerted if the monitored person is in an inappropriate location. This is done by the base station making appropriate calls that could also be done automatically from the attached cellular phone on the monitored person.

Similarly, this invention will be very useful for the monitoring of stolen cars. When circuitry in the car detects that the car is being moved by unauthorized people, then the generic phone number cellular phone will begin transmitting this fact along with location information. Also, by differentiating the position information, the system can calculate the direction of heading and forward all of this to the authorities.

Figure 16:
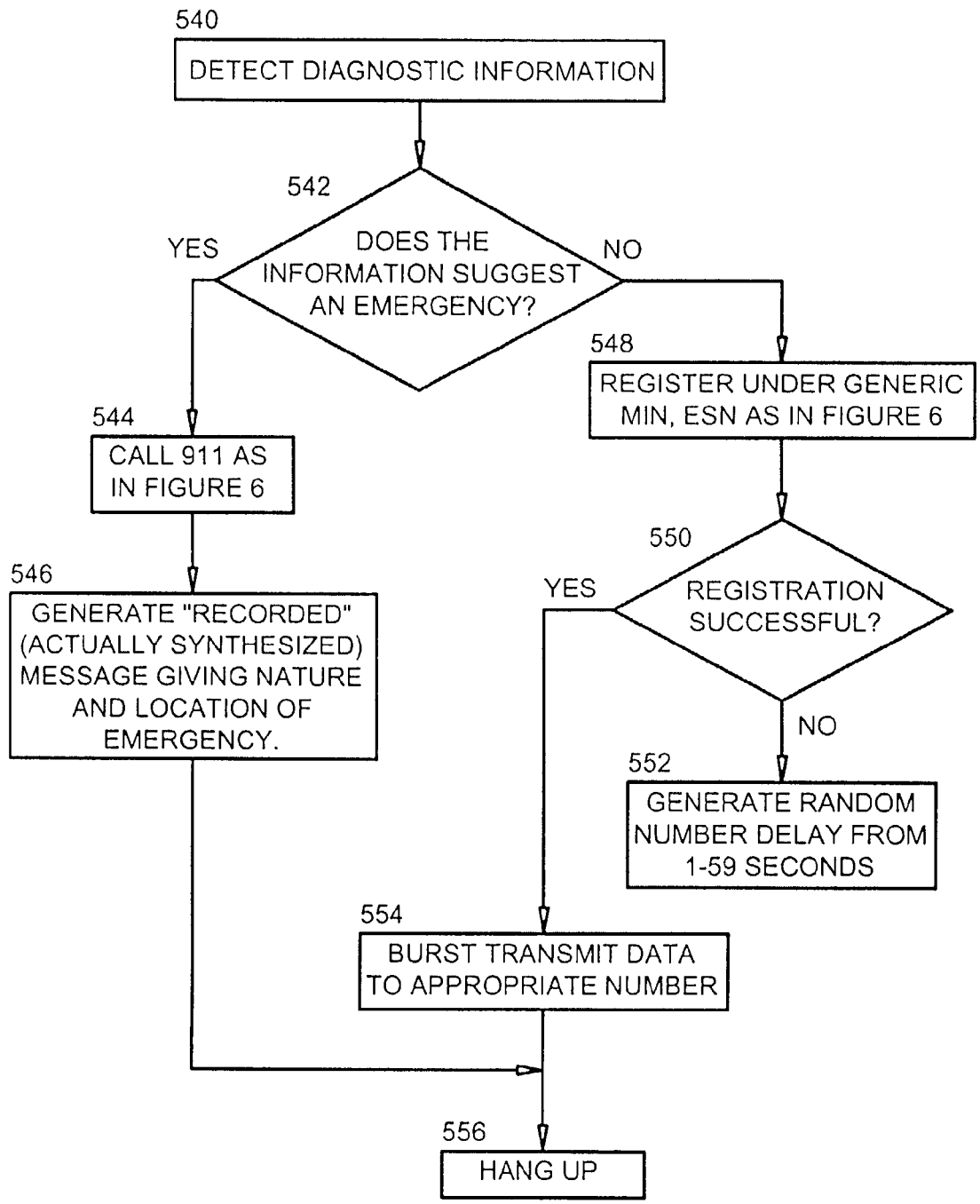
FIG. 16 shows the method of using the instant invention for medical monitoring.

FIG. 16 shows the method of this invention for medical monitoring. It begins at step 540 recording diagnostic information. This could be from an implantable device or an external monitor or a nerve stimulator, etc.

It then moves to step 542 and asks if the information suggests an emergency. If it suggests an emergency then it proceeds to step 544 to call 911 as done in the method shown in FIG. 6. The system then, at step 546, generates a recorded (actually synthesized) voice giving the nature and location of the emergency and then goes to step 556 to hang up. If the information does not suggest an emergency then the system goes to step 548 where it registers under the generic mobile identification number and electronic serial number also shown earlier in FIG. 6.

In step 550 the system will then ask if the registration was successful. If it is then it goes to step 554 to do a burst transmission of the data to the appropriate number and then proceeds to step 556 to hang up.

If the registration was unsuccessful in step 550 the system proceeds to step 552 and generates a random (or pseudorandom) number delay from 1 to 59 seconds and then goes back to step 550 to attempt registration. This is due to the fact that another similar system or the same service may be attempting to transmit the medical information at the exact same second. Note that this system does not require a batch of MINs. This exact embodiment in FIG. 16 allows just the mere waiting for an open "slot". Of course this can also be combined with the searching for further phone numbers as shown in FIG. 12.

This approach can also be used for industrial emergency monitoring. The term is here used to refer to many (often unwitnessed) emergencies such as oil and water spills or factory or forest fires. Before this invention, one would have had to pay for a cellular phone account for each monitoring site. With the instant invention, an enormous number of monitoring sites can use the same generic number.

Figure 17:
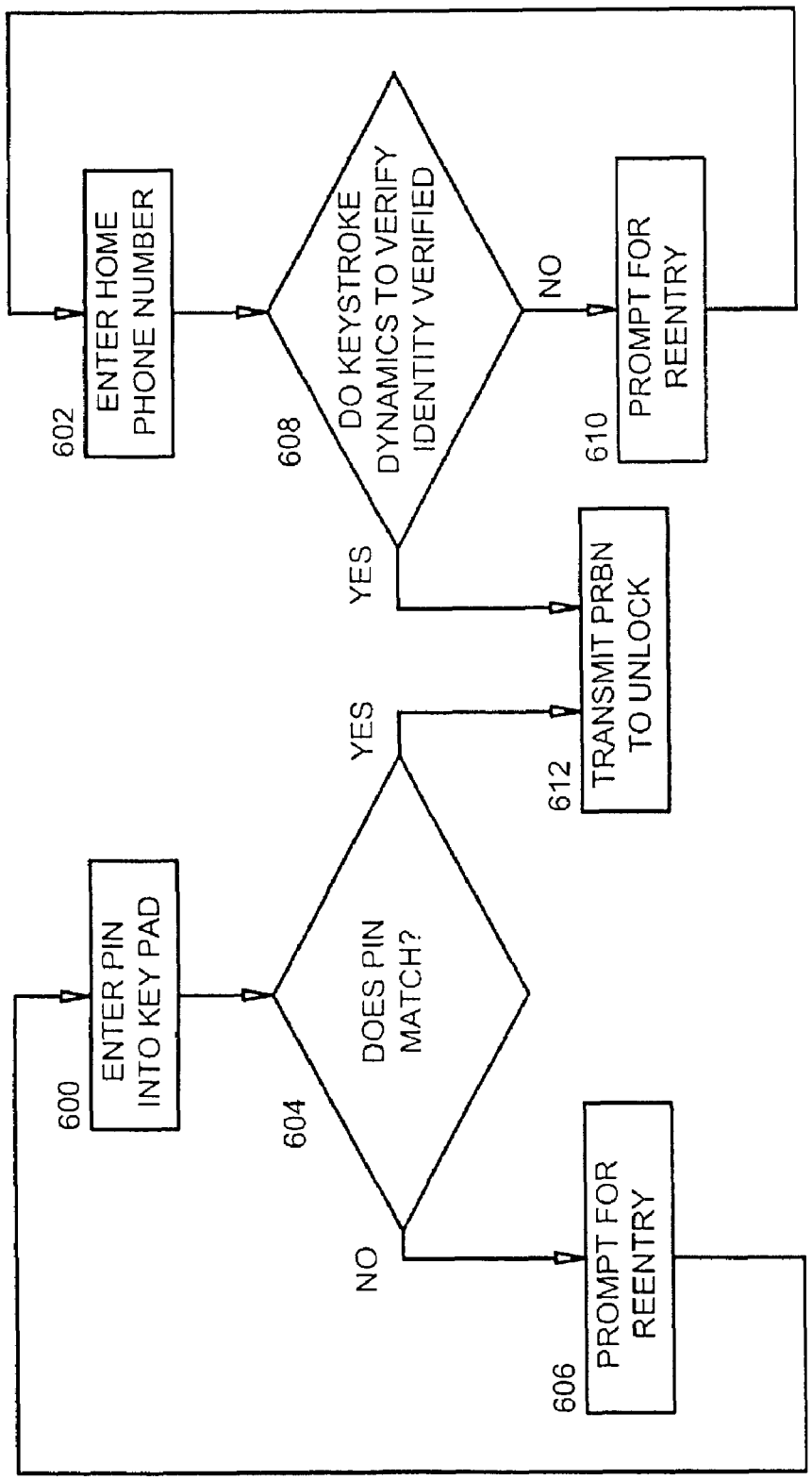
FIG. 17 shows the method of using the instant invention to allow the cell phone to act as a car or house key.

FIG. 17 shows the method of using the instant invention to allow the cell phone to act as a car or house key. The system begins at step 600 where the operator is prompted to enter a PIN into the key pad. At step 604 the systems asks if the PIN matches the base station database. If it does not, then at step 606 we prompt for reentry and go back to step 600. If the PIN matches then the system goes on to 612 to transmit a pseudo random binary number (PRBN) to unlock the car. As an alternative to a PIN the system will prompt as many people as there are PINs to enter their home phone number in step 602. At step 608 the system does a keystroke dynamics to verify the identity as shown in FIGS. 13 and 14. Once the identity is verified then the system goes to step 612 to transmit the PRBN to unlock the car or house. If the identity is not verified then the system goes to step 610 to prompt for reentry.

Figure 18:
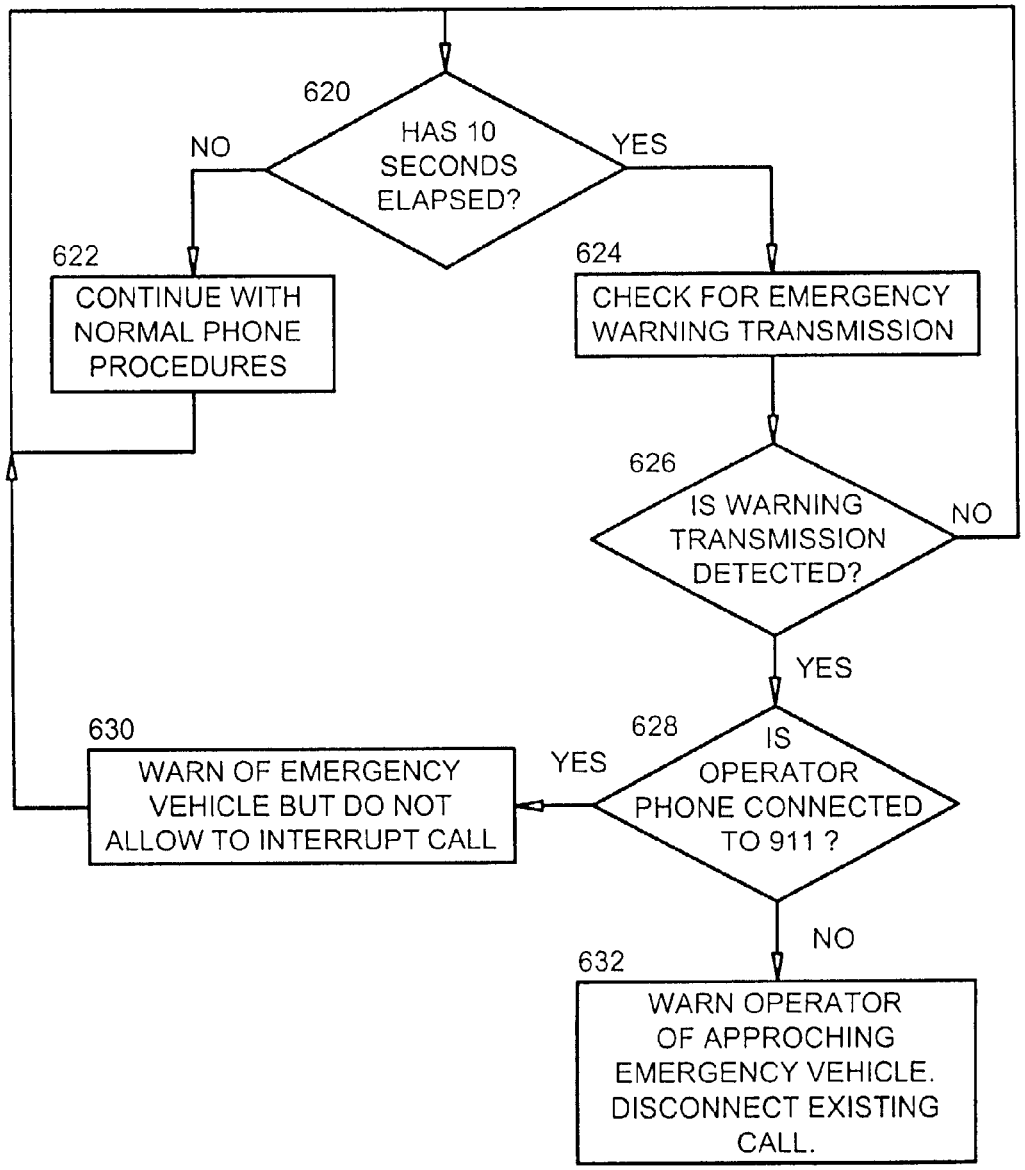
FIG. 18 shows the embodiment of the method for operating the phone in an emergency warning "as a siren proxy."

In FIG. 18 is shown the embodiment of the invention for modification to allow police and emergency vehicles to get the attention of the operator. There is a major problem with people talking on their cellular phones and not hearing emergency vehicles behind them. The system proceeds as follows. At step 620 the system asks if 10 seconds has elapsed. This is because the system will at every 10 seconds check the emergency vehicle warning transmission. If 10 seconds has not elapsed then the system at step 622 continues with normal phone procedures. If it is time for a 10 second check then the systems proceeds to step 624 where it checks for the emergency transmission.

If an emergency warning transmission is detected in step 626 then the system goes to step 628 where it asks if the operator phone is connected to 911. This is very important as criminal usage to spoof a police transmission could be used to shut off a citizen's cell phone and thus prevent them from making an emergency call. It is important that a 911 call be able to bypass the shut off. If the operator is connected to 911 then the system proceeds to step 630 where the warning is given.

If in fact the user is not connected to 911 then the system goes to step 632 and warns by the synthesized voice of an emergency vehicle and disconnects the existing call so that the user/driver can focus on driving out of the way.

Figure 19:
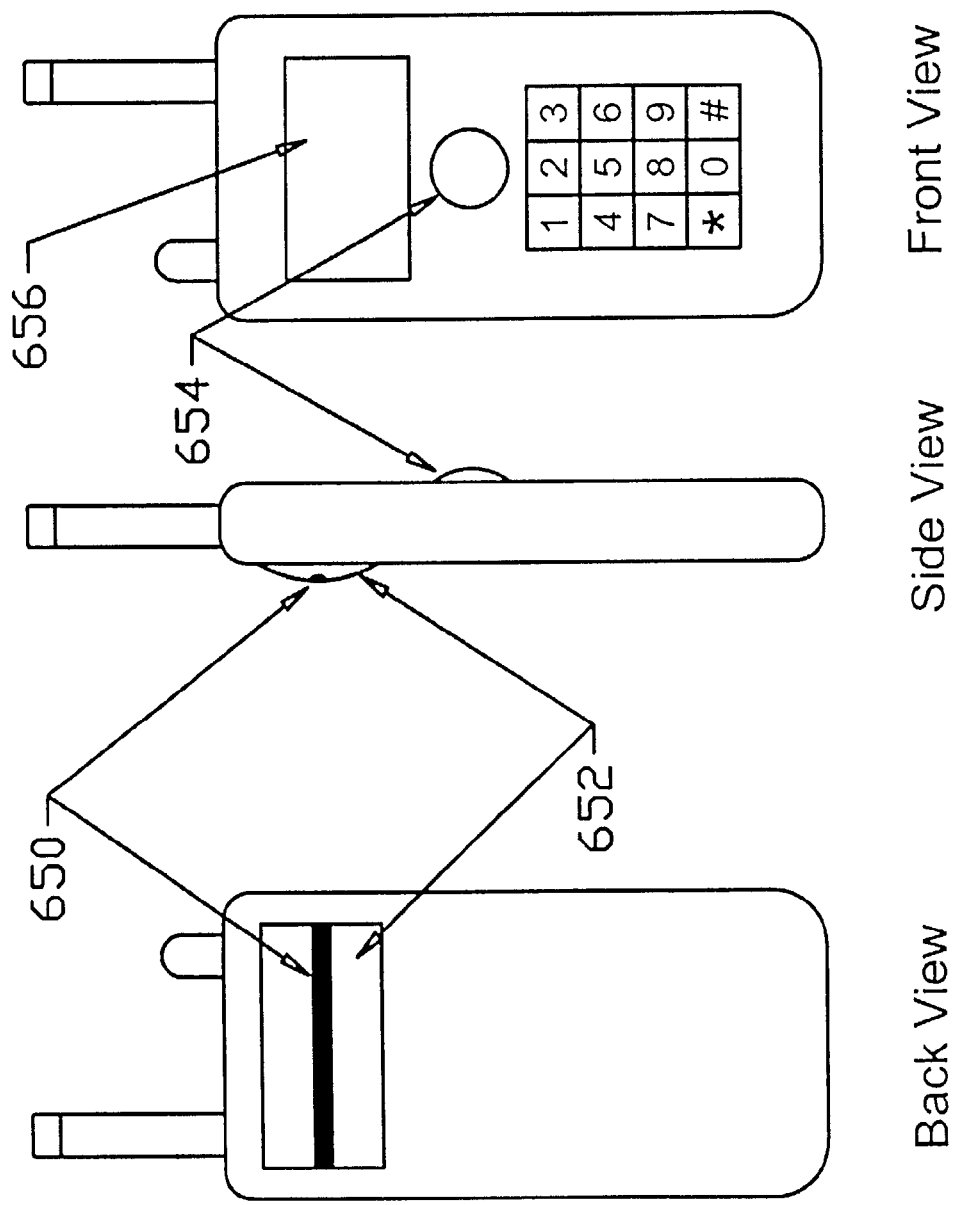
FIG. 19 shows the embodiment of the invention with a fax scanner on the phone.

FIG. 19 depicts the fax scanning version of the invention. Here charge coupled device (CCD) scanning array 650 is embedded in linear lens 652. The scanned data is observed in either the "fisheye" lens 654 or in the normal operating screen 656. With this scanner the phone can either directly send a fax or, with optical character recognition circuitry, send actual text based on the scanned image.

We claim:

1. A cellular phone comprising a power source, a communications antenna, communications electronic circuitry, and high voltage electronics, cooperatively connected so that the phone will generate a high voltage shock for self defense purposes but also allow normal cell phone communication in which the cooperative connection is at the antenna so that the antenna is used as a shocking electrode.

2. The cellular phone of claim 1 which includes a switch to enable the generation of the high voltage shock.

3. The cellular phone of claim 1 which includes two switches which must both be actuated in order to enable the generation of the high voltage shock.

4. The cellular phone of claim 1 which includes a flashlight.

5. The cellular phone of claim 1, wherein the lengths of the pseudo-antenna and the communications antenna are such that the tips of the antennas form a line which is at an angle different from 90° from the long axis of the phone.

6. The cellular phone of claim 1 in which the cooperative connection is at the power source so that the communications circuitry and the high voltage electronics draw from the same power source.

7. The cellular phone of claim 1 in which the high voltage shock has a voltage in the range of 25,000 to 50,000 volts.

8. The cellular phone of claim 1 in which the high voltage electronics includes a capacitor capable of storing at least about 1000 volts.

9. The cellular phone of claim 1 in which the high voltage electronics includes a high voltage transformer capable of handling at least 1000 volts.

10. The cellular phone of claim 1 in which the high voltage electronics includes at least one spark gap.

11. The cellular phone of claim 1 which includes at least one over-voltage protection device to protect the communications electronics circuitry from damage from high voltages from the high voltage electronics.

12. A personal safety device consisting of:
a) a source of electrical power;
b) a first circuit, capable of generating a high frequency signal, connected to the source of electrical power,
c) a communications antenna connected to the first circuit,
d) a second circuit, capable of generating a high voltage, operably connected to the source of electrical power
e) a human operable switch connected to the second circuit,
so that the device is capable of transmitting cellular phone signals and also defensive high voltage shocks when directed by a human operator in which the high voltage shock is delivered at least to the communications antenna.

13. The personal safety device of claim 12 which includes a switch to enable the generation of the high voltage shock.

14. The personal safety device of claim 12 which includes two switches which must both be actuated in order to enable the generation of the high voltage shock.

15. The personal safety device of claim 12 which includes a flashlight.

16. The personal safety device of claim 12, wherein the lengths of the pseudo-antenna and the communications antenna are such that the tips of the antennas form a line which is at an angle different from 90° from the long axis of the phone.

17. The personal safety device of claim 12 in which the high voltage shock has a voltage in the range of 25,000 to 50,000 volts.

18. The personal safety device of claim 12 in which the high voltage electronics includes a capacitor capable of storing at least about 1000 volts.

19. The personal safety device of claim 12 in which the high voltage electronics includes a high voltage transformer capable of handling at least 1000 volts.

20. The personal safety device of claim 12 in which the high voltage electronics includes at least one spark gap.

21. A method of dealing with a personal security threat comprising the steps of:

packaging cellular phone circuitry together with a high voltage self-defense shocking apparatus,
connecting the cellular phone circuitry to the high voltage self-defense shocking apparatus at the cellular phone antenna,
generating a high voltage shock on command via the high voltage self-defense shocking apparatus,
delivering the high voltage shock to the cellular phone antenna, and
placing an emergency assistance call via the cellular phone circuitry.

22. A cellular phone comprising a power source, a communications antenna, communications electronic circuitry, and high voltage electronics, cooperatively connected so that the phone will generate a high voltage shock for self defense purposes but also allow normal cell phone communication in which the high voltage shock is delivered at least to the communications antenna.

23. A cellular phone comprising a power source, a communications antenna, communications electronic circuitry, and high voltage electronics, cooperatively connected so that the phone will generate a high voltage shock for self defense purposes but also allow normal cell phone communication in which the high voltage shock is delivered to a pseudo-antenna as well as to the communications antenna.

24. A personal safety device consisting of:
a) a source of electrical power;
b) a first circuit, capable of generating a high frequency signal, connected to the source of electrical power,
c) a communications antenna connected to the first circuit,
d) a second circuit, capable of generating a high voltage, operably connected to the source of electrical power
e) a human operable switch connected to the second circuit,
so that the device is capable of transmitting cellular phone signals and also defensive high voltage shocks when directed by a human operator in which the high voltage shock is delivered to a pseudo-antenna as well as to the communications antenna.

* * * * *